(12) United States Patent
Steele et al.

(10) Patent No.: US 12,131,839 B2
(45) Date of Patent: Oct. 29, 2024

(54) METHOD FOR INJECTING STRAND-BLOCKED CABLE

(71) Applicant: Novinium, LLC, Kent, WA (US)

(72) Inventors: James Steele, Seattle, WA (US); David C. Busby, Midland, MI (US); Weston Philips Chapin Ford, Seattle, WA (US); Wayne J. Chatterton, Bellevue, WA (US); Kevin Laux, Kent, WA (US); Nathanael Laurie, Burien, WA (US)

(73) Assignee: NOVINIUM, LLC, Kent, WA (US)

( * ) Notice: Subject to any disclaimer, the term of this patent is extended or adjusted under 35 U.S.C. 154(b) by 538 days.

(21) Appl. No.: 17/459,877

(22) Filed: Aug. 27, 2021

(65) Prior Publication Data
US 2022/0375656 A1    Nov. 24, 2022

Related U.S. Application Data

(60) Provisional application No. 63/191,877, filed on May 21, 2021.

(51) Int. Cl.
| | |
|---|---|
| *H01B 13/32* | (2006.01) |
| *H01B 3/46* | (2006.01) |
| *H01B 13/00* | (2006.01) |
| *H01B 7/28* | (2006.01) |
| *H01B 7/285* | (2006.01) |

(52) U.S. Cl.
CPC ............ *H01B 13/322* (2013.01); *H01B 3/46* (2013.01); *H01B 13/0016* (2013.01); *H01B 7/2813* (2013.01); *H01B 7/285* (2013.01)

(58) Field of Classification Search
None
See application file for complete search history.

(56) References Cited

U.S. PATENT DOCUMENTS

| | | | |
|---|---|---|---|
| 3,943,271 | A | 3/1976 | Bahder et al. |
| 4,095,039 | A | 6/1978 | Thompson |
| 4,703,132 | A | 10/1987 | Marciano-Agostinelli et al. |
| 4,963,695 | A | 10/1990 | Marciano-Agostinelli et al. |

(Continued)

OTHER PUBLICATIONS

Banerjee et al., "Gable Rejuvenation Practices," CEATI International Report No. T154700-50/129, Nov. 2017, 1 page.

(Continued)

*Primary Examiner* — Farah Taufiq
(74) *Attorney, Agent, or Firm* — Davis Wright Tremaine LLP; George C. Rondeau, Jr.

(57) ABSTRACT

A method for rejuvenating a strand-blocked cable having a conductor comprised of a plurality of conductor strands with interstitial volume therebetween blocked by a PIB based mastic, the conductor being surrounded by a polymeric cable insulation. The method comprising installing injection adapters that seal the cable ends of the cable and are usable to inject fluid into the interstitial volume between the conductor strands of the cable; elastically expanding the polymeric cable insulation through the application of pressure to the interstitial volume between the conductor strands of the cable; and injecting at least one injection fluid in which the PIB based mastic is mostly insoluble into the interstitial volume between the conductor strands of the cable.

8 Claims, 7 Drawing Sheets

(56) References Cited

U.S. PATENT DOCUMENTS

| | | | |
|---|---|---|---|
| 5,049,593 A * | 9/1991 | Marciano-Agostinelli | ............... B29C 48/06 524/521 |
| 6,331,353 B1 | 12/2001 | Foulger | |
| 6,350,947 B1 | 2/2002 | Bertini et al. | |
| 6,355,879 B1 | 3/2002 | Bertini et al. | |
| 6,697,712 B1 | 2/2004 | Bertini et al. | |
| 7,615,247 B2 | 11/2009 | Bertini et al. | |
| 7,658,808 B2 | 2/2010 | Bertini et al. | |
| 7,700,871 B2 | 4/2010 | Bertini et al. | |
| 7,777,131 B2 | 8/2010 | Chatterton et al. | |
| 8,205,326 B2 | 6/2012 | Bertini et al. | |
| 8,656,586 B2 | 2/2014 | Bertini et al. | |
| 2005/0192708 A1* | 9/2005 | Bertini | ............... H01B 7/285 700/98 |
| 2008/0173467 A1* | 7/2008 | Bertini | ............... H01B 3/46 174/25 C |
| 2010/0122453 A1* | 5/2010 | Bertini | ............... H01B 3/20 29/825 |
| 2021/0280341 A1 | 9/2021 | Chatterton et al. | |

OTHER PUBLICATIONS

IEEE, "IEEE Guide for the Selection, Testing, Application, and Installation of Cables having Radial-Moisture Barriers and/or Longitudinal Water Blocking," IEEE Std 1142-2009, Mar. 26, 2010, 72 pages.

Steenis, E.F. "Water treeing the behavior of water trees in extruded cable insulation," Institutional Repository, Doctoral Thesis, Jun. 8, 1989, 197 pages.

\* cited by examiner

METHOD FOR INJECTING STRAND-BLOCKED CABLE

BACKGROUND OF THE INVENTION

Field of the Invention

The present invention relates to silane injection of solid dielectric medium-voltage power cables manufactured with primarily polyisobutylene (PIB) based longitudinal strand-blocked mastic between the conductor strands.

Description of the Related Art

Power Cable:

Power cables are generally constructed by a metallic conductor surrounded by polymeric insulation. For the purpose of illustration, a medium voltage power cable 100 is shown in FIG. 1. Typical construction for the medium voltage power cable 100 comprises a conductor 102 made of aluminum or copper. Often the conductor 102 will be comprised of multiple individual conductor strands 104 that are arranged in concentric layers. The space between the individual conductor strands is known as the interstitial volume 106. Surrounding the conductor is a conductor shield 108, a semi-conducting layer often included in the design of medium and high-voltage power cables to reduce electrical stress in the insulation. Surrounding the conductor or conductor shield is insulation 110 that has a substantial dielectric strength and is typically made of polyethylene (PE), cross-linked polyethylene (XLPE) or ethylene-propylene rubber (EPR). Surrounding the insulation 110 is an insulation shield 112, a second semi-conducting layer often included in medium and high-voltage power cables to reduce electrical stress in the insulation. Surrounding the insulation shield 112 is a ground 114 used to carry stray current and drain capacitive charge from the cable. The ground 114 may consist of multiple conductors arranged circumferentially around the cable called concentric neutrals 116. The outermost layer of the cable is the optional jacket 118 that provides mechanical protection to the cable. The construction of medium-voltage cable rated from 5 kV to 46 kV is further described in ICEA S-94-649-2000. While a medium voltage power cable with a jacketed concentric neutral construction has been shown, it should be appreciated that other forms of power cable exist, such as bare-concentric cable, tape-shield cable, low voltage cable, armored cable, submarine cable and high-voltage cable. Such cables may see the addition of elements such as armor or the subtraction of elements such as semi-conductive shields or neutrals.

Aging Mechanisms for MV Power Cables:

There are a number of phenomena that can "age" medium-voltage cable insulation. The most damaging of these is the diffusion of water from the ground through the jacket and insulation shield and into the insulation. Once in the insulation, the water can oxidize the PE, XLPE or EPR and result in a phenomenon known as water treeing occurring. [Steenis E.F. (1989) Water treeing the behavior of water trees in extruded cable insulation, 201p]. These water trees look like microscopic trees in the insulation, and they can grow from either of the two semi-conductive shields or can initiate within the insulation and grow radially towards the semi-conductive shields in the shape of a bowtie. Left untreated, these "water trees" grow in the insulation and lead to premature cable failure.

The life of the cable in the ground is directly related to the health of the insulation layer.

Rejuvenating Power Cables:

The space between the conductor strands is known as the interstitial region. First practiced in the 1980's, cable rejuvenation increases the cable insulation's dielectric strength by injecting water reactive alkoxysilanes into the interstitial region of the conductor [U.S. Pat. Nos. 7,615,247 and 7,611,748]. The fluid traverses from the near end of the cable to the far end of the cable. The fluid then diffuses radially from the interstitial region into the insulation. The fluid raises the dielectric strength of the insulation and reacts with water, effectively treating the water trees. As it reacts, the fluid becomes an oligomer decreasing its rate of diffusion by orders of magnitude, allowing the fluid to dwell in the cable for an extended period of time. Treating these water trees increases the remaining life of the cable by many years.

The typical injection process is as follows. The cable is de-energized and new terminations are placed on each end. The cable is checked for neutral condition and a slight positive flow of air is placed on the cable to ensure flow from one end of the cable to the other. The cable is then injected with the treatment fluid from the near end, and when the fluid arrives at the far end and fills the interstitial region, the cable is considered injected and is put back in service.

Cable Rejuvenation Methods:

Today, there are two primary methods of cable rejuvenation in commercial practice with both being well documented in literature [Banerjee, et al, "Cable Rejuvenation Practices", CEATI Report No. T154700-50/129, November 2017].

The first method known as improved un-sustained pressure rejuvenation (iUPR) relies on a continuous flow path being present in the conductor and uses it as the reservoir to house the injection treatment for treating the insulation. This method has been well described in literature, including U.S. Pat. Nos. 4,766,011 and 5,372,841.

The second method known as sustained pressure rejuvenation (SPR) creates additional interstitial volume through elastic expansion and increases flow rate due to the use of moderate pressure [U.S. Pat. Nos. 7,615,247 and 7,611,748].

Further improvement as disclosed in U.S. Pat. No. 8,572,842 includes the application of thermally enhanced rejuvenation (TER) to create interstitial volume through a combination of thermal expansion at an elevated temperature and elastic expansion due to a moderate pressure.

Strand Block Cables:

In the 1980's, cable manufacturers began incorporating strand-filling compounds into the conductors of medium voltage cable that filled the interstitial spaces and restricted water migrating along the length of cable. Strand blocking materials are a proprietary mixture for each manufacturer, but typical formulations will consist of polyisobutylene (PIB) and about 40-50% carbon black filler to help smooth the electrical field. Today, almost 90% of medium voltage cables manufactured are strand filled according to industry surveys. However, field experience shows strand blocked cables perform similarly to non-strand filled cables of like construction and vintage in terms of AC-breakdown performance and are still susceptible to water-tree aging and failures.

One of the unfortunate side effects of strand-blocking the conductor is that it renders the population of cable uninjectable by existing methods. The strand-blocking compound effectively fills the interstitial space of the cable's conductor and blocks the injection of rejuvenation fluids. Consequently, circuit owners must turn to cable replacement when strand-blocked cables age due to water trees and the AC breakdown strength of the cable drops to unacceptable levels. Today, after nearly 40 years of strand-blocked cable installation, there are billions of feet of strand-blocked cable in operation, the oldest of which is at or nearing its end of life. There is a need for a new injection process to address water trees in strand-blocked cable.

From the original Bander patent (U.S. Pat. No. 3,943,271) to modern concept (U.S. Pat. Nos. 4,095,039, 4,703,132, 4,963,695 and 6,331,353, for example), it has been known that keeping cables dry is the only way to ensure long cable life. Bander determined that water caused a shortening of life through the growth of water trees, as described above, and that water intrusion during manufacture or after the cable was buried leads to a reduction in cable life. This led to the adoption of jackets on cables to keep water out of the insulation and a strand blocked mastic in the conductor to impede water flow along the conductor. There had been many early attempts to impede water and many formulas of mastic employed to prevent flow of fluid down the interstitial region of the cable. Today, with few exceptions, all strand-block mastic is manufactured by Chase Corporation. This material is stable, works well in the electrical field and is employed during the manufacture of cables. It easily passes industry standard tests (like ICEA T31-610) and has been used successfully for more than 25 years. The general industry belief is that if one blocks the migration of water in the conductor then the cable life will be extended as water trees cannot be formed without water.

Chase A162A strand block mastic was introduced to the MV Power Cable Industry in 1990 and has been effectively used since (see Table 1). This material is sold under the name A162A BIH2Ock. Pre-1990 materials used by manufacturers (Excl. Pirelli Cables) were materials formulated in-house by material chemists. Chemists in the solar industry use similar formulas to seal solar panels to boards and electronics. Pirelli used an in-house developed polyisobutylene (PIB) based material supplied by United Technologies of St Louis, MO However, industry experts have confirmed that all mastic formulations are very similar and have very similar physical properties.

TABLE 1

Formulation & Proportions: Polyisobutylene (PIB)-based; Exxon Chemicals Americas.

| Ingredient | Weight % | Specific Gravity | Specific Volume | Tolerance (+/−), % |
|---|---|---|---|---|
| Vistanex LM-MS | 59.41 | 0.914 | 109.409 | 1.00 |
| Irganox 1010 | 0.99 | 1.15 | 1.449 | 10.00 |
| Graphite | 39.60 | 2.26 | 29.499 | 1.00 |
| Total | 100.00 | 1.199 | 140.357 | |

Conventional Injection Methods are not Suitable:

The industry has created and accepted ANSI/ICEA T31-610 "Test Method for Conducting Longitudinal Water Penetration Resistance Tests on Blocked Conductors" and IEEE 1142-2009 "IEEE Guide for Selecting, Testing, Application, and Installation of Cables Having Radial Moisture Barriers and/or Longitudinal Water Blocking" as tests to ensure cables have an adequately blocked conductor.

Due to the shortage of free interstitial volume in strand-blocked cable, lack of continuous flow path and physical properties of the strand block material, conventional injection methods as described in U.S. Pat. No. 7,615,247, "Method for treating electrical cable at sustained elevated pressure", U.S. Pat. No. 8,205,326, "Method for treating electrical cable at sustained elevated pressure", U.S. Pat. No. 8,656,586, "Method for treating electrical cable at sustained elevated pressure", and U.S. Pat. No. 8,572,842, "Method for thermally enhancing injection of power cable", are not suitable as currently practiced for strand blocked cable.

A new method to inject power cables manufactured with PIB based strand block mastics is necessary. It is desirable to inject the cable's conductor with enough fluid volume to protect the cable's insulation from water trees for a duration similar to the treatment of non-strand blocked cable.

DETAILED DESCRIPTION OF THE INVENTION

Figure 1:
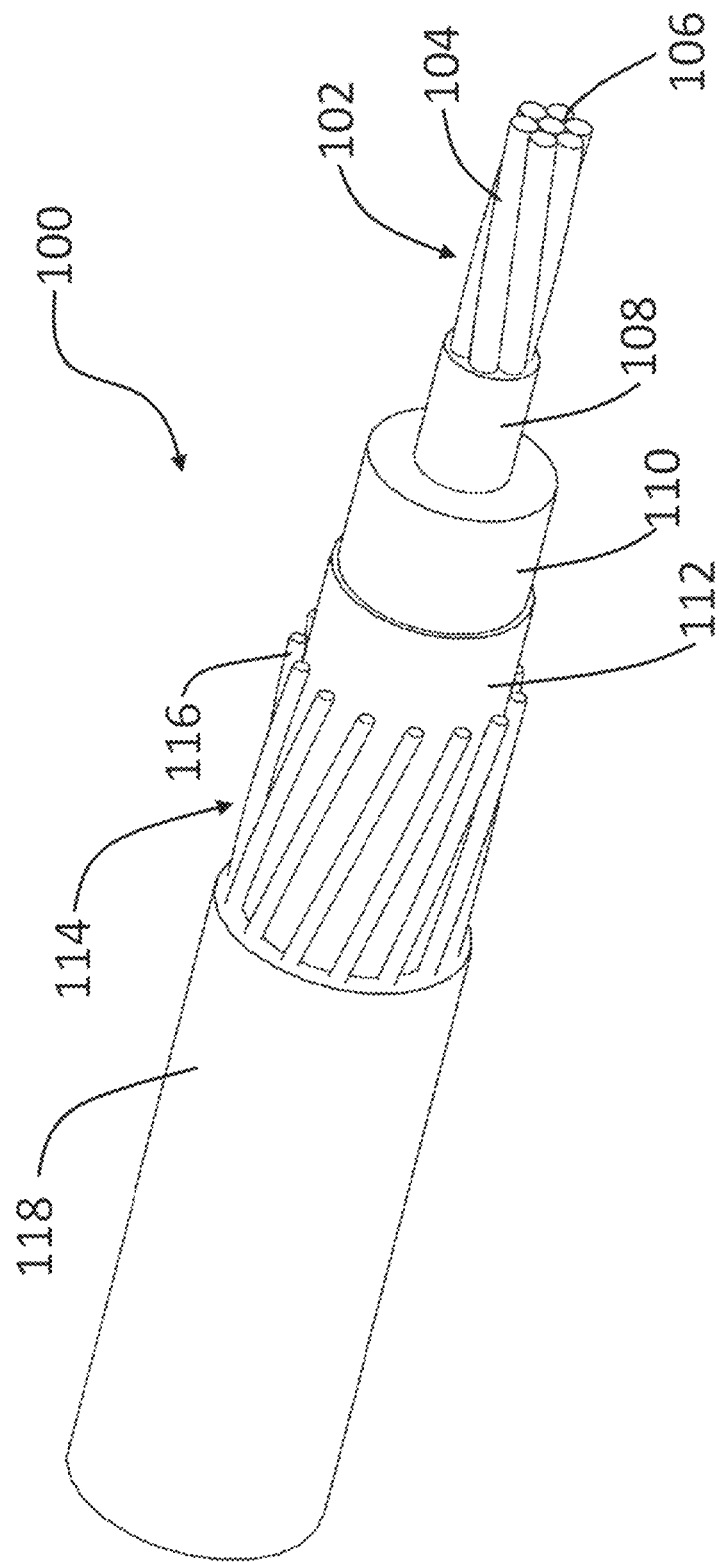
FIG. 1 illustrates a typical prior art medium voltage cable construction.

A new injection protocol that addresses the population of cables manufactured with primarily PIB based longitudinal strand block mastic is herein disclosed. The disclosed method includes the injection of a silane-based rejuvenation fluid into the cable's conductor in which:

A. installing injection adapters that seal the cable ends of the cable and are usable to inject fluid into the interstitial volume between the conductor strands of the cable;

B. elastically expanding the polymeric cable insulation through the application of pressure to the interstitial volume between the conductor strands of the cable; and C. injecting at least one injection fluid into the interstitial volume between the conductor strands of the cable in which the PIB based mastic is mostly insoluble. The injection fluid being selected for its ability to:

1. dissolve less than 10% by weight PIB-based strand block mastic at 55° C.
2. maintain a viscosity under about 10 cP throughout the course of injection,
3. diffuse into polyethylene cable insulation with a diffusion coefficient of at least 1×10E−8 at 55° C.

Cable injection fluids for treating non-strand filled cable have been well documented in prior art such as U.S. Pat. Nos. 4,766,011, 5,372,841, 7,658,808, 7,700,871 and 7,777,131 and some have even been commercially practiced for over 30 years. However, the prior art fails to anticipate the injection of cables with PIB-based strand-blocked conductor. Further, the rejuvenation fluid formulations and methods they teach are not suitable for injecting strand blocked cable.

While the composition of PIB-based longitudinal strand block mastic has been previously disclosed in literature, little is known about the physical properties of PIB-based strand block material. An understanding of the construction and physical properties of the strand block mastic will allow the injection technician to better select the injection fluid and parameters of pressure and temperature used for injection. These properties include the conductor fill %, carbon black content of the mastic and the viscosity and glass transition temperature for various strand block mastic materials.

Conductor Fill %:

In a strand-filled cable, the amount of strand block material contained in the conductor can be quantified as the Fill %. The free volume is the volume between the conductor strands not occupied by the strand fill mastic. The free volume can be calculated as outlined below.

For various strand block cable makes and vintages, a detailed cable geometry was performed on each cable to calculate interstitial volume. The amount of strand block material per unit length was determined by weighing before and after removal of the strand block with toluene. The difference in mass being the amount of the strand block material per unit length. In this study, a unit length of 12 inches of cable was used. The density of strand block materials based on PIB can be found in literature and was confirmed through testing to generally range between 1.17 and 1.20 g/cm$^3$.

For the purpose of this calculation, a density of 1.20 g/cm$^3$ was assumed and used to calculate the filled volume. The results of the analyses are shown in Table 2.

TABLE 2

Fill % for Various Strand Blocked Cable Samples

| Cable Manufacturer | Cable Vintage | Conductor Size (AWG) | Interstitial Volume (cc/ft.) | Strand Block PIB (g/ft.) | Fill % |
|---|---|---|---|---|---|
| BICC-Brand MT | 2003 | #2 | 1.0 | 0.418 | 34% |
| BICC-Brand MT | 2008 | 1/0 | 3.2 | 2.283 | 59% |
| Cable MT | Early 2000s | 1/0 | 3.2 | 2.226 | 58% |
| Hendrix | 2019 | 1/0 | 3.2 | 1.557 | 41% |
| Nexans | 2019 | 1/0 | 3.2 | 2.451 | 64% |
| Oconite | 2018 | 1/0 | 3.2 | 0.770 | 24% |
| Pirelli | 1996 | 1/0 | 3.2 | 1.477 | 38% |
| Pirelli | 1996 | 1/0 | 3.2 | 1.671 | 43% |
| Pirelli | 2005 | 1/0 | 3.2 | 2.313 | 60% |
| Prysmian | 2019 | 1/0 | 3.2 | 1.682 | 44% |
| Prysmian | 2019 | 1/0 | 3.2 | 2.250 | 59% |
| Prysmian | 2019 | 1/0 | 3.2 | 1.769 | 46% |
| Prysmian | 2020 | 1/0 | 3.2 | 1.802 | 47% |
| Prysmian | 2020 | 1/0 | 3.2 | 1.780 | 46% |
| SOUTHWIRE | 2014 | 4/0 | 6.8 | 1.279 | 16% |
| SOUTHWIRE | 2004 | 1/0 | 3.2 | 1.801 | 47% |
| SOUTHWIRE | 2017 | 1/0 | 3.2 | 0.731 | 19% |
| | | | | Average | 44% |

Fill percentage is found to range from under 20% to over 60%. As not all cable makes and vintages were quantified, the actual range could be appreciably more. Variation is noted between manufacturers, vintages, between spools from the same apparent manufacturing run and along the length of the same cable.

The measurements reveal that on average, about 44% of the conductor's interstitial volume is filled by strand block material. If fluid were to be injected and fill the remaining 56% void space that would leave most medium voltage cables undertreated. As an example, an average non-strand filled 1/0 AWG cable with light compression has an interstitial volume of 3.2 cc/ft. For a non-strand filled cable, the fluid target would be a complete fill of the interstitial volume. However, in a strand block cable, a maximum free volume to receive treatment would typically be at best 56% of 3.2 cc/ft or 1.8 cc/ft and leave the cable under the fluid target. However, as strand block mastic is not uniformly distributed within the conductor and the free volume is actually a distribution of small voids, a complete fill of the free volume is unlikely.

Carbon Black Content:

In addition to molecular weight of the PIB, carbon black is known to have influence on the physical properties of mastics. A weighed portion of mastic (16.3579 g) was added to about 3 times as much weight of toluene, and the mixture was dissolved by shaking and heating in a 55° C. oven. The black suspension in yellow liquid was filtered through a weighed medium fritted filter funnel to trap the carbon black. The carbon black was washed on the filter frit with additional toluene to remove any remaining PIB. The carbon black was then washed with acetone and dried by pulling air through the frit for 1 hour. The frit was then placed in a 55° C. oven to remove any remaining solvent, and then the frit plus carbon black was weighed. The weight of the carbon black recovered was 7.9444 g or 48.6 wt % of the initial weight of mastic. This value is significantly higher than the 39.6 wt % documented by industry. This variation likely explains some of the differences observed between strand block materials of various cable manufacturers and vintages.

Glass Transition Temperature (Tg):

Differential Scanning Calorimetry (DSC) was performed on strand block (SB) mastic samples collected from five cable manufacturers including Southwire 2017, Pirelli 1987, Hendrix 2012, Prysmian 2009 and Okonite 2018. All cables were XLPE insulated with the exception of the Okonite sample which was EPR insulated.

Samples were tested using a Mettler Toledo model DSC 3+. The parameters for testing began at −90° C. That temperature was held for 2 minutes to ensure the sample had thermally equalized. At a rate of 10° C. per minute, the chamber was heated to 90° C., held for 1 minute then cooled at the same rate back to −90° C. This temperature cycle was performed twice for each sample. The first temperature cycle of a polymer sample often contains the thermal history of the material which is then erased in subsequent cycles.

The four mastic samples show similar features especially in the second cycle when thermal history has been erased. All mastic samples show a characteristic endothermic peak near −70° C. This peak corresponds to the glass-transition temperature (Tg) for polyisobutylene rubber (PIB). The onset temperature and peak temperature were recorded and can be seen in Table 3.

TABLE 3

Glass Transition Temperature for various strand block mastics

| | Glass-Transition Temperature (Tg)-° C. | | | |
|---|---|---|---|---|
| Sample | Tg Onset- First Cycle | Tg Onset- Second Cycle | Tg Peak- First Cycle | Tg Peak- Second Cycle |
| Pirelli-1987 | −69.16 | −68.97 | −66.81 | −66.34 |
| Southwire-2017 | −72.26 | −73.05 | −70.85 | −71.56 |
| Hendrix-2012 | −72.75 | −73.28 | −71.21 | −71.47 |
| Prysmian-2009 | −70.01 | −70.23 | −68.49 | −68.35 |

Viscosity:

An Anton Paar MCR302 rheometer was used to measure flow characteristics of various strand block samples collected from new and field-aged cables. The rheometer used the parallel plate method at a constant torque of 0.01 Nm and measured the resistance to flow, or viscosity, of the mastic. Measurements were taken in 5° C. increments from 100° C. down to 40° C.

Figure 2:
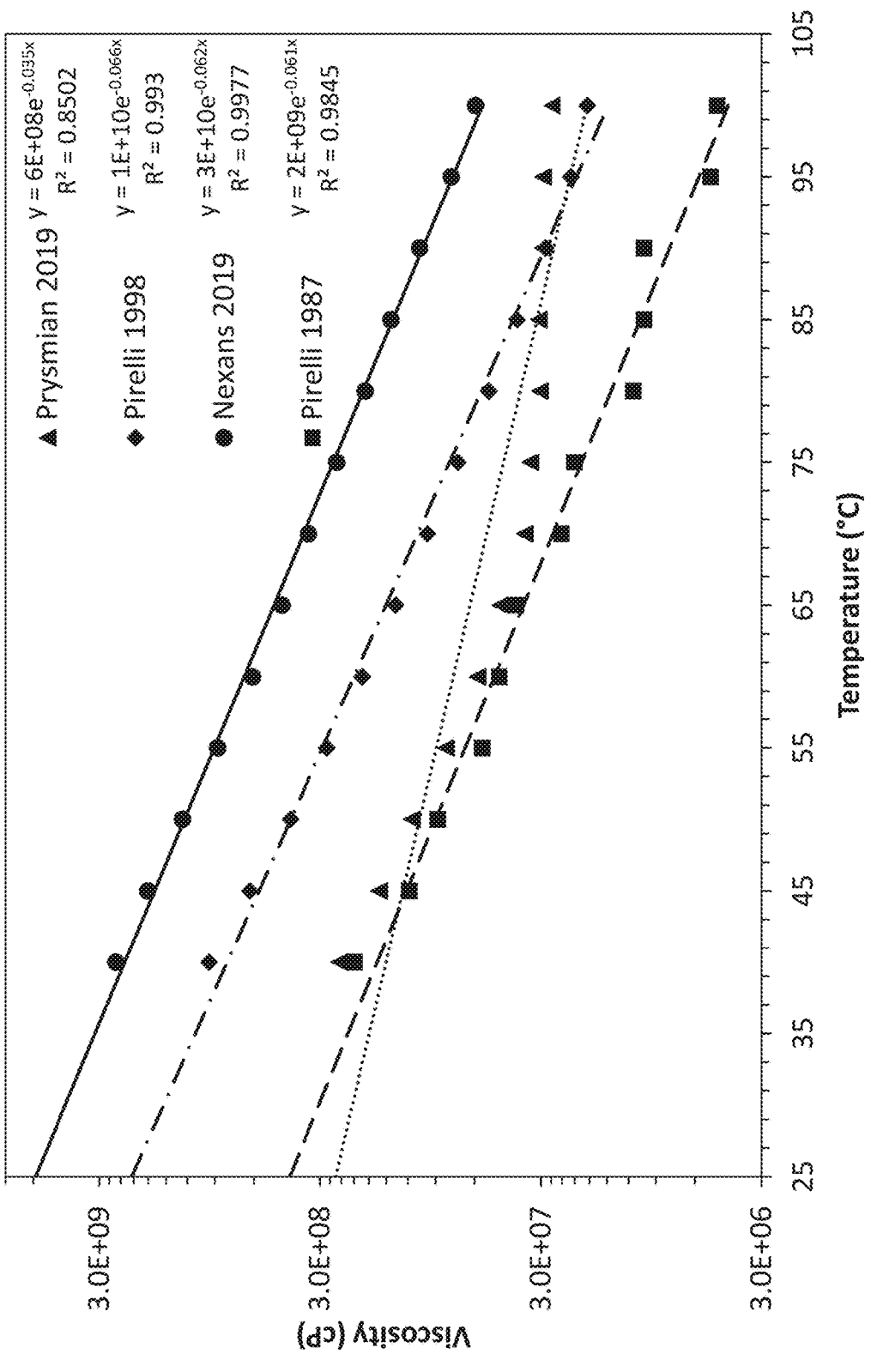
FIG. 2 illustrates viscosity curves for various strand block mastics.

The data are shown in FIG. 2 with the rheometer platen temperature on the X-axis and the log of viscosity on the Y-axis. Exponential fitted lines with R-squared values and equations are shown for each sample. Fitted lines were extrapolated to 25° C. to show the viscosity near room temperature. From 40° C. to 70° C. all samples follow the same exponential decrease in viscosity as the temperature increases. The same is also true up to 100° C. for all samples except the Prysmian 2019, which showed some instability at higher temperatures.

During the collection process it was noted that strand-block materials varied in adhesion, notably the Nexans 2019 mastic was the stickiest. The data reveals that for a given temperature, the viscosity difference between samples can vary by more than one order of magnitude. This variation is attributed to the difference in molecular weight of the PIB and specific concentration of carbon black. The data also reveals that mastics tend to experience about an order of magnitude change in viscosity for every 40° C. change in temperature.

The understanding of the PIB-based strand block mastic's physical properties can be applied to create an injection protocol tailored to strand block cables. The thermally enhanced rejuvenation (TER) process disclosed by U.S. Pat. No. 8,572,842 can be optimized for strand block cable by seeing an increase in conductor temperature that is sufficient to reduce the viscosity of the strand block mastic by at least an order of magnitude to encourage flow.

In one embodiment, the cable temperature is increased by about 40° C. above ambient. Further, the cable temperature is increased so that the viscosity of the strand-block mastic is decreased by about 1 order of magnitude or greater.

Injection Fluid Viscosity

An important property of an injection fluid ideally suited for strand-blocked cable injection, is its viscosity. The injection fluid must be able traverse the length of strand-blocked cable conductor by connecting the network of voids within the mastic that make of the free volume. Viscosity is however dynamic and it is well known to change with temperature and in the case of the dialkoxysilanes, the degree of polymerization upon hydrolysis with water.

For reference, the viscosity of several injection fluids cited as preferred embodiments in prior art are provided in Table 4. The viscosity values below are collected from readily available manufacturer data sheets on the monomer or measured in the laboratory and are representative of the monomer.

TABLE 4

Viscosities for Common Injection Fluids

| Injection Fluid | Viscosity (cSt) |
|---|---|
| Dimethyldimethoxysilane | 0.44 |
| Dimethyldibutoxysilane | 1.19 |
| Phenylmethyldimethoxysilane | 1.71 |
| Cyanobutylmethyldimethoxysilane | 2.81 |
| Tolylethylmethyldimethoxysilane | 2.92 |
| Tolylethylmethyldi-n-butoxysilane | 4.74 |

However, the injection of cable manufactured with a strand blocked mastic-filled conductor poses a further challenge as PIB mastic dissolves into the fluid. The higher molecular weight PIB will increase the rejuvenation fluids viscosity and will slow the rate of injection into the cable. In the extreme, the fluid viscosity may increase to a point that the flow of rejuvenation fluid into the cable stops altogether leaving the cable partly treated. This phenomena was well documented in the example below.

Example 1 (SBT11-Phase 1)

Figure 3:
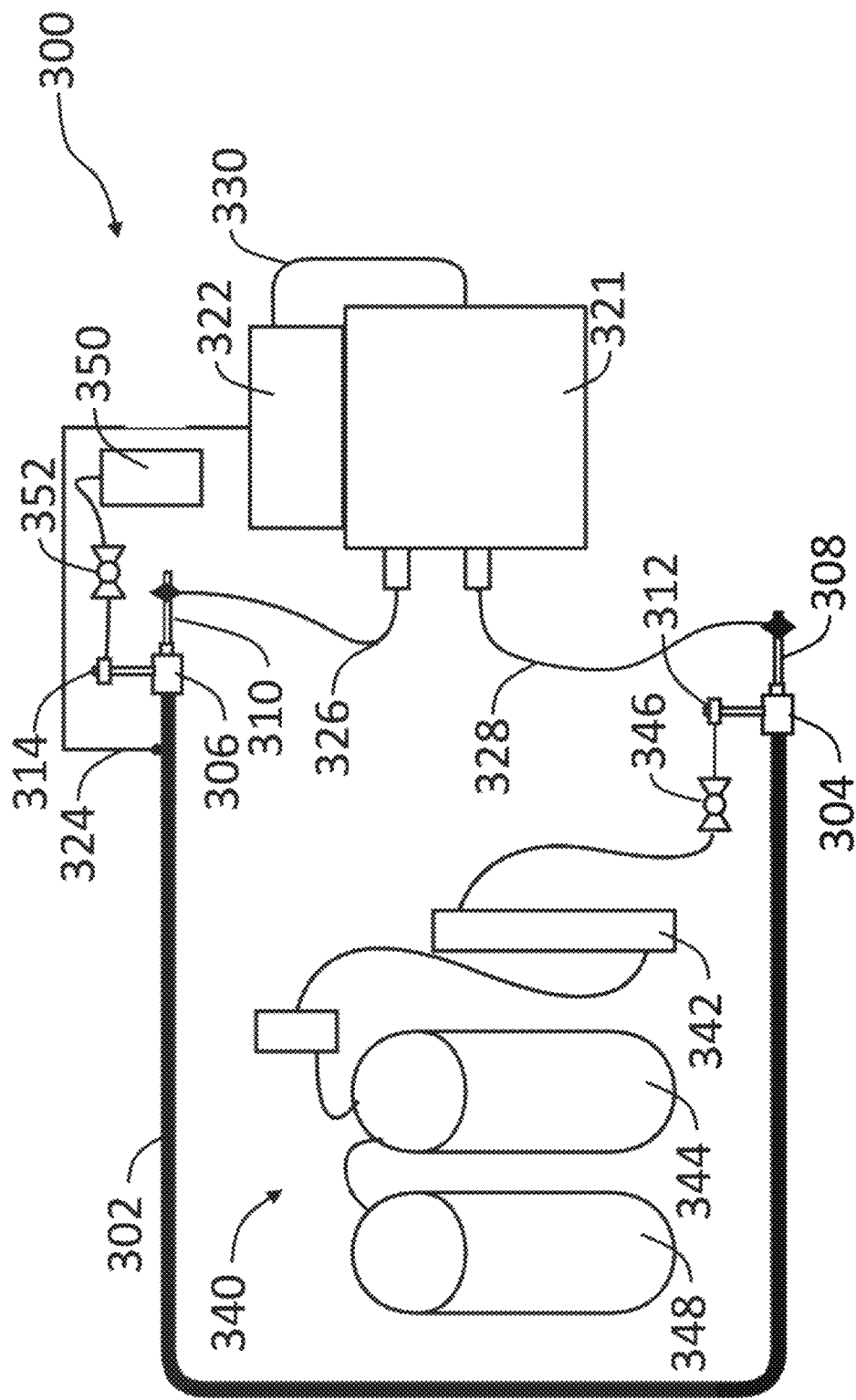
FIG. 3 is a test setup using an AC transformer to drive current.

In FIG. 3, test setup 300 is comprised of a cable sample 302 arranged in a U shape. The cable sample is terminated at both ends with electrical connectors 308 and 310 and injection adapters 304 and 306, respectively, to make the fluid seal. A DC current supply 321 is connected to each end of the cable sample through interconnect cables 326 and 328 to complete the circuit. The DC current supply is connected to a temperature controller 322 through interconnect 330 to provide on/off control of the current. The temperature controller is joined to the cable sample through test lead 324 to monitor temperature. Injection tools 312 and 314 are used to provide fluid access to the injection adapters on the feed side and receiving side of the cable sample, respectively. The feed side of the cable is connected to a feed assembly 340 through a ball valve 346. The feed assembly is comprised of a fluid flow meter 342, a fluid injection tank 344 and a compressed gas cylinder 348. The receiving side of the cable is connected to a catch tank 450 through a ball valve 352.

For the purpose of the example, a rejuvenation fluid consisting primarily of dimethyl-dibutoxysilane (DMDB) as disclosed in U.S. Pat. No. 7,777,131 was selected. It was mixed with <1.0 wt % hydrolysis condensation catalyst DDBSA (dodecylbenzene sulfonic acid). While DDBS was used, other hydrolysis condensation catalysts liked tetra-isopropyl titanate (TiPT) could be used.

Injections were performed at 250 psi and 50° C. to elastically expand the cable. A 10-foot dummy cable instrumented with a thermocouple in a hole drilled to the conductor was used to control temperature. The thermally enhanced rejuvenation (TER) system was set to a current of 250 Amps. Ambient temperature was 16.5° C. near the floor. Both ends of the cable were closed as soon as enough sample was collected. There was at least an hour between the start of heating and injection start for the 50 feet and 100 feet samples to be sure the test cable had stabilized at temperature. The results are shown in Tables 5 and 6.

TABLE 5

| | Results | | |
|---|---|---|---|
| | | Cable Length | |
| Parameter | 20 ft Sample | 50 ft Sample | 100 ft Sample |
| Injection Duration (min:ss) | 2:10 | 8:34 | 114:56 |
| Bottle 1 Fill Duration (s) | 25 | 204 | 514 |
| Bottle 2 Fill Duration (s) | — | 130 | 505 |
| Bottle 1 Amount Collected (g) | 15.82 | 19.86 | 18.25 |
| Bottle 2 Amount Collected (g) | 12.47 | 19.32 | 24.07 |
| Fluid injected by tank gauge (cc) | 66.64 | 99.96 | 199.92 |
| Weight Before (g) | 4575 | 11195 | 22090 |
| Weight After (g) | 4597 | 11249 | 22221 |
| Weight Gain (g) | 22 | 54 | 131 |

The flush samples were analyzed by FTIR to determine their PIB concentration and referenced against a known calibration curve to estimate viscosity. The results for the 3 cables are shown in Table 6. Weight percent of PIB in the first flush sample (Bottle #1) is observed to increase fairly linearly with length of cable.

Figure 4A:
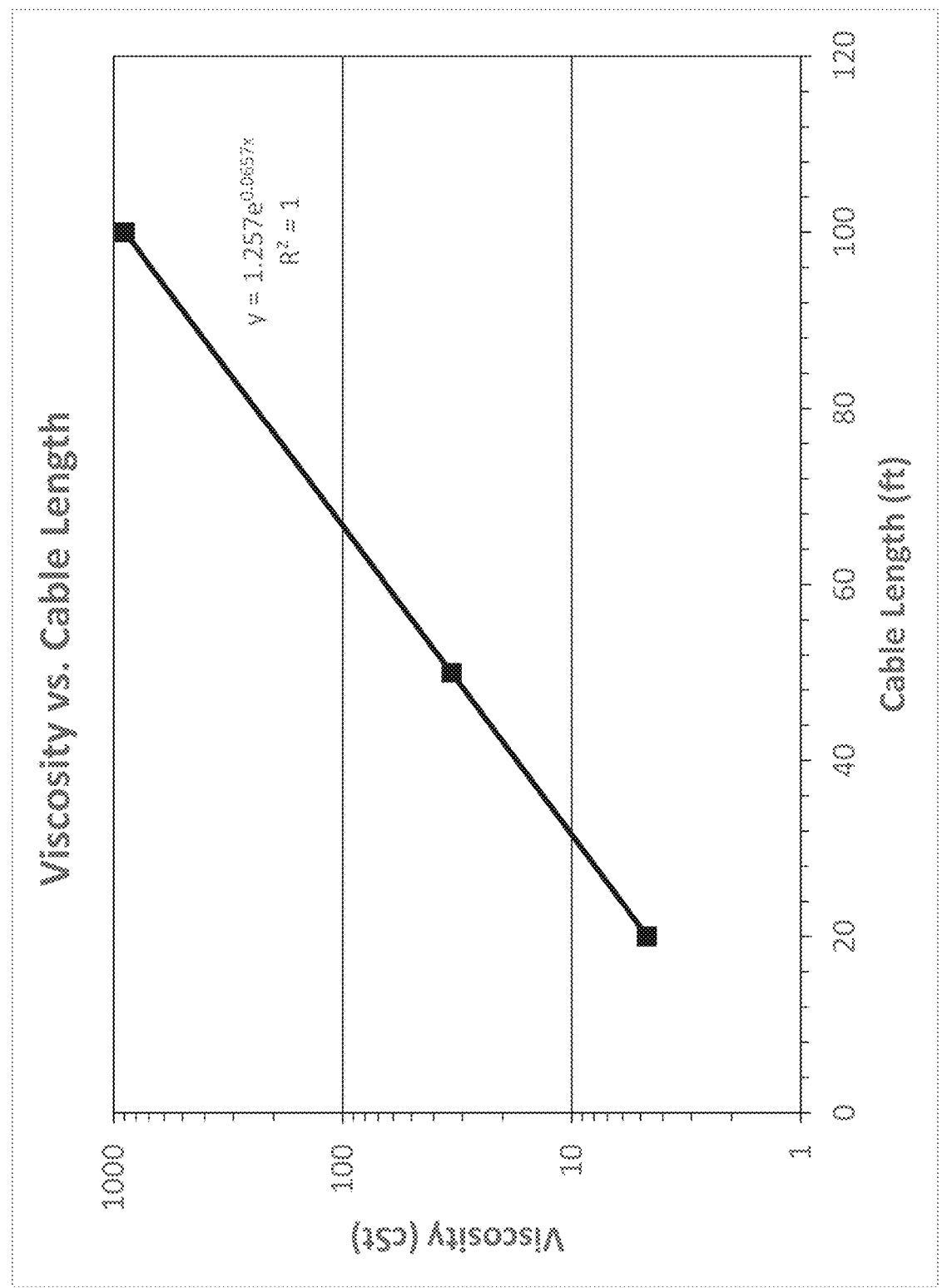
FIG. 4A illustrates the relationship between viscosity and cable length when strand block mastic is mostly soluble in the injection fluid.
Figure 4B:
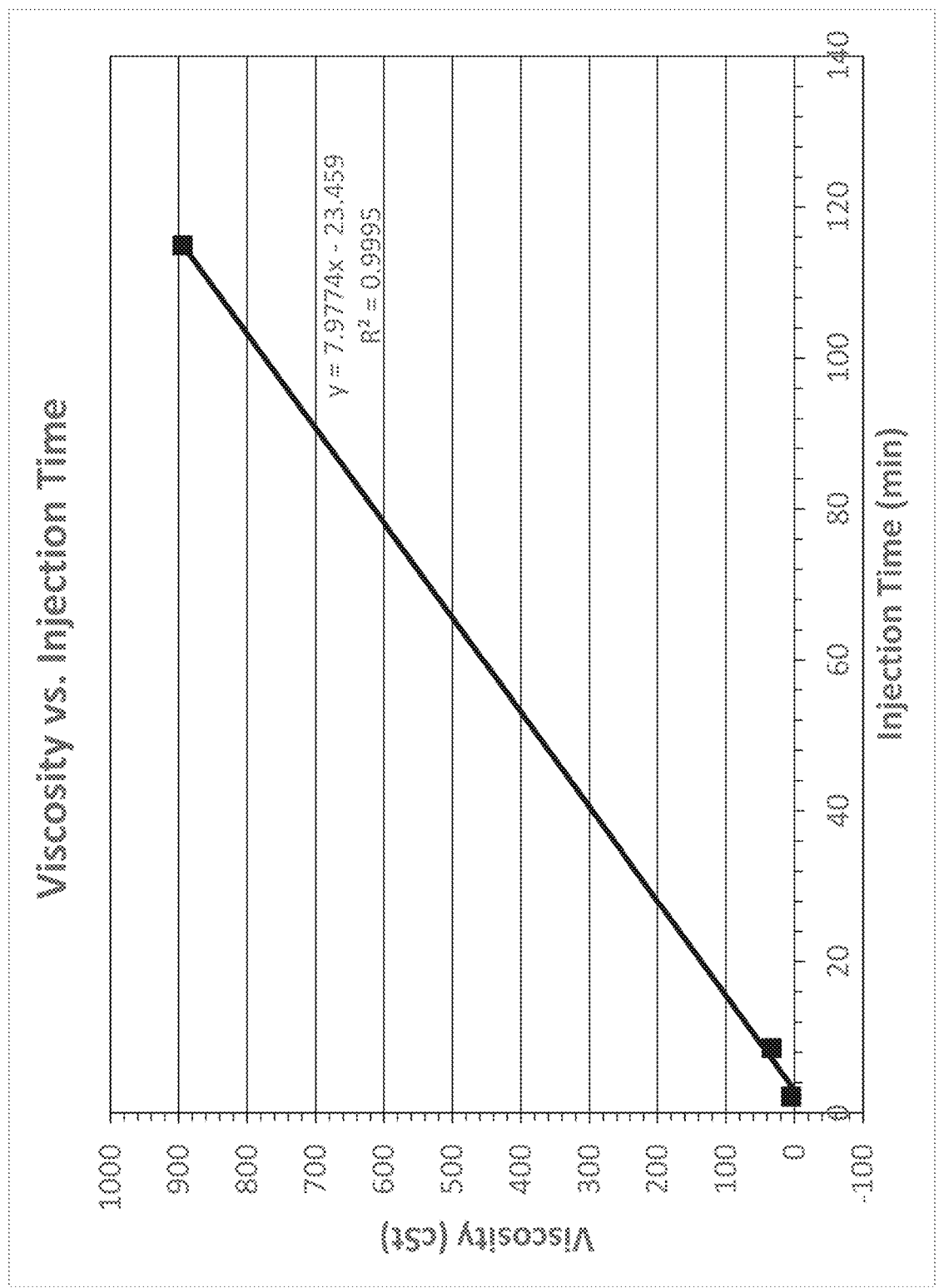
FIG. 4B illustrates the relationship between viscosity and injection duration when strand block mastic is mostly soluble in the injection fluid.
Figure 4C:
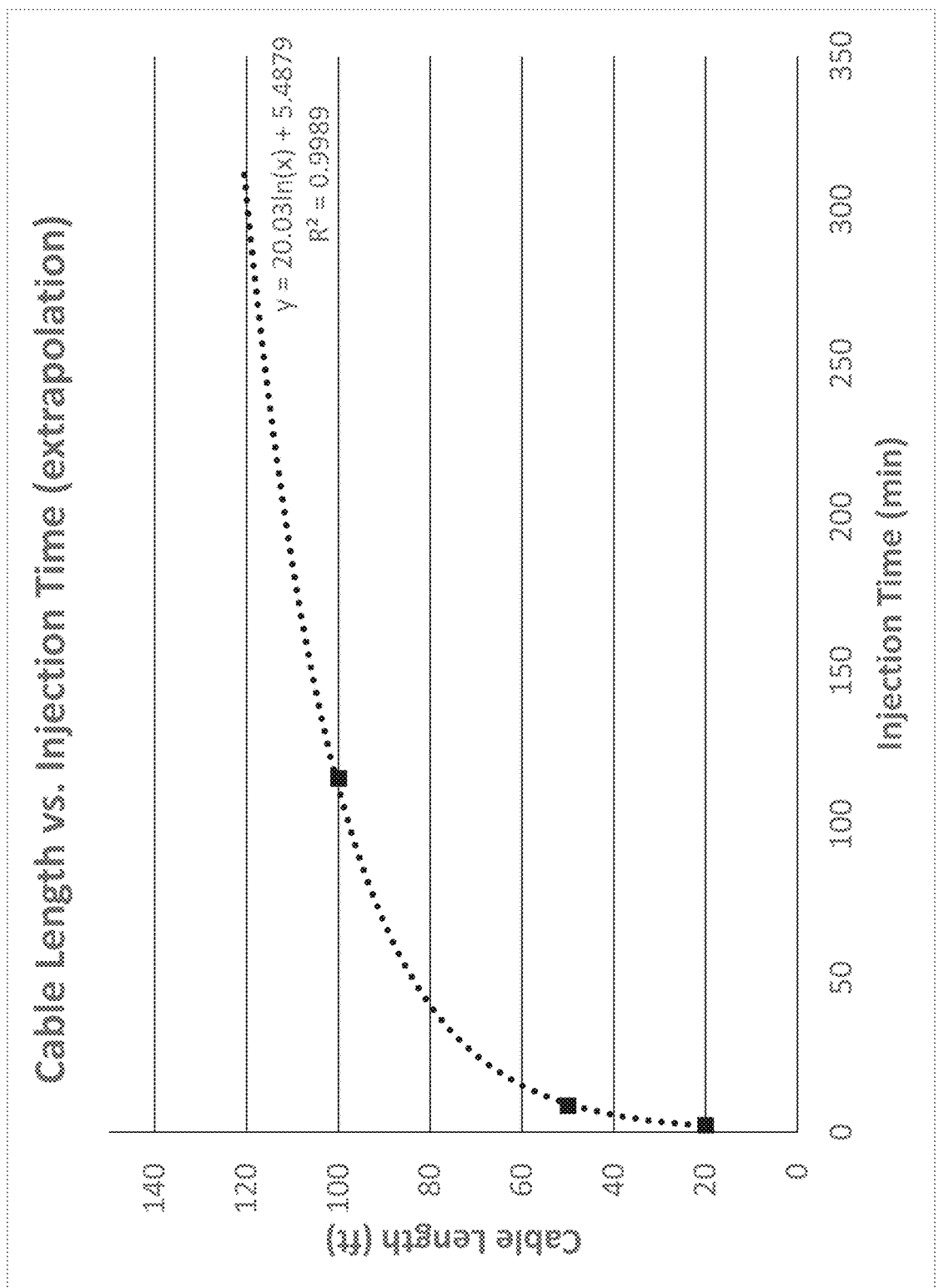
FIG. 4C illustrates the relationship between cable length and injection duration when strand block mastic is mostly soluble in the injection fluid.

Referring to FIG. 4A, viscosity of the flush sample was plotted against cable length and found to increase following an exponential fit. Referring to FIG. 4B, viscosity was also plotted against the injection duration as described in Table 5. The injection duration ranged from just over 2 minutes for the 20-foot sample to over 114 minutes for the 100-foot sample where viscosity followed a linear fit. FIG. 4C plots cable length as a function of injection duration. Extrapolation of the data demonstrates that a practical limit on the length of cable that can be injected using this methodology is achieved, in this case about 140 ft and well short of the typical 300 to 400 ft lengths of URD cable installed in the field. While this experiment only looked at one particular cable and followed one protocol, it can be appreciated that a maximum could similarly be calculated for other cable.

TABLE 6

Results

Flush Collected in Bottle #1

| Cable Length (ft) | Weight % PIB | Estimated Viscosity (cSt) | Treatment (g/ft) |
|---|---|---|---|
| 20 | 10.6 | 4.7 | 1.1 |
| 50 | 22.9 | 33.3 | 1.1 |
| 100 | 43.5 | 894.1 | 1.3 |

Injection Fluid in which PIB is Mostly Insoluble

To minimize the effect highlighted above, cables with PIB-based strand-blocked mastic filled conductor should be injected with a silicone-based rejuvenation fluid in which PIB is mostly insoluble. In addition to restoring the dielectric strength of the cable insulation, the right injection fluid should be capable of maintaining a low viscosity despite coming into contact with the PIB-based mastic solute to keep injection times low. This is of particular importance as the length of cable increases. For reference, the average URD cable in field installation is approximately 350 ft and injection times longer than 1 day may be undesirable.

The ability of various injection fluids to form solutions with PIB-based strand block mastic is demonstrated through the screening test outlined below. While many injection fluids were evaluated, the test is by no means fully exhaustive and it should be appreciated that a similar screening method could be applied to other injection fluid candidates.

The solubility characteristics of carbon black filled PIB strand block mastic were tested in a range of solvents to determine the most efficacious material for strand block injection. The mastic was obtained from Southwire 2019 strand blocked cable by opening the cable and scraping the sticky mastic material from the conductors. Spheres of the strand block mastic were placed in glass vials, the test liquid was added, and the vial was shaken at room temperature to qualitatively determine solubility. In most cases, the vials were then placed in a 55° C. oven for varying periods of time. The vials were removed periodically for brief shaking. The results can be seen in Table 7.

TABLE 7

Results from Solubility Testing of Rejuvenation Fluids & Solvents.

| Sample ID | Composition | Temperature ° C. | Time hours | Result |
|---|---|---|---|---|
| DCB3-50A | PIB only | 40-100 | 3 | Slight softening of PIB above 50° C. |
| DCB3-50B1 | PIB:732/30 1:1 | 55 | 144 | No apparent dissolution |
| DCB3-50B2 | PIB:732/30 1:2 | 55 | 144 | No apparent dissolution |
| DCB3-50B2 | PIB:732/30 1:4 | 55 | 144 | No apparent dissolution |
| DCB3-50C | PIB:Xylene 1:2 | 25-55 | 6 | Started dissolving at room temperature, completely dissolved at 55° C. leaving a carbon black suspension |
| DCB3-50D | PIB:TEM 1:5 | 55 | 168 | No apparent dissolution at room temp so aged at 55° C. Small particles were formed after 1 hour. After 168 hours with some shaking, all mastic reduced to small particles but not as fluffy as particles formed in xylene. |
| DCB3-50E | PIB:PhMDM 1:5.3 | 55 | 72 | Even with vigorous shaking, little of the mastic dissolved. |
| DCB3-50F | PIB:TEM 1:2.5 | 55 | 30 | After 8 hours with occasional shaking about 1/3 of mastic had dissolved, and after 30 hours, all the mastic had dissolved. |
| DCB3-50G | PIB:DMDB 1:5.3 | 55 | 1 | After 5 min of shaking at room temperature, half the mastic had dissolved, but further shaking did not dissolve the rest. 30 min at 55° C. with occasional shaking dissolved the rest of the mastic. |
| DCB3-50H | PIB:DMDB 1:3.3 | 55 | 12 | Most of the mastic dissolved after 2 hours with complete dissolution overnight. The suspension was filtered to isolate a yellow solution. |

TABLE 7-continued

Results from Solubility Testing of Rejuvenation Fluids & Solvents.

| Sample ID | Composition | Temperature °C. | Time hours | Result |
|---|---|---|---|---|
| DCB3-50P | PIB:TEMDB 1:3.2 | 55 | 47 | Not all of the mastic was dissolved after 47 hours at 55° C. |
| DCB3-50S | PIB:TEMDB 1:3.2 | 55 | 47 | After 47 hours with periodic shaking, all the mastic was dissolved. The suspension was filtered through filter paper to isolate a yellow liquid. |
| DCB3-50AC | PIB:DMDM 1:3.3 | 55 | 48 | Shaking at room temp produced a little dissolution, but even 48 hours at 55° C. just broke the large pieces into smaller granules. The fluffy carbon black seen with DMDB was not evident. |
| DCB3-50AD | PIB:DMDE 1:3.3 | 55 | 48 | Shaking at room temp produced a moderate amount of dissolution, but even 48 hours at 55° C. just broke the large pieces into smaller granules. The fluffy carbon black seen with DMDB was not evident. DMDE was more soluble than DMDM |
| DCB3-50AF | PIB:i-Pr2 1:3.3 | 25 | 1.3 | Most of the mastic dissolved with occasional shaking at room temperature. It appeared less soluble than DMDB |
| DCB3-50AG | PIB:Bu2 1:3.3 | 25 | 2 | Partially dissolved at room temperature with shaking. It was less soluble than DMDB. |

The PIB based strand block mastic was first tested without a solvent at elevated temperature to assess its "melting" behavior. A sphere of PIB was placed in a glass vial, and the vial was placed in an oven. The temperature was increased from 40° C. to 100° C. over a period of 3 hours. There appeared to be a slight softening above 50° C., but the material did not flow even at 100° C.

When spheres of the PIB-based mastic were mixed in a 1:2 weight ratio with xylenes and agitated at room temperature, the PIB began dissolving immediately. The liquid portion became black colored, and fine, carbon black particles were evident. Most of the mastic dissolved at room temperature, and the remainder dissolved within 6 hours at 55° C. This produced a yellow solution with very fine black powder suspended in it.

PIB-based mastic was then tested with Novinium Cable-Cure® 732/30 rejuvenation fluid at 1:1, 1:2, and 1:4 weight ratios at 55° C. with occasional agitation over a period of 144 hours. Cablecure 732/30 is a fluid mixture primarily consisting of tolylethylmethyldimethoxysilane (TEM) and Cyanobutylmethyldimethoxysilane (CBM). No dissolution of the PIB was observed in any of the samples.

PIB-based mastic with tolylethylmethyldimethoxysilane (TEM) in a 1:5 ratio did not appreciably dissolve at room temperature, so it was aged at 55° C. After about 1 hour with occasional shaking, the large spheres of PIB began to break into smaller particles, and eventually all the large spheres were reduced to small particles, but the fluffy carbon black particles resulting in the case of xylene were not seen. The experiment was repeated with a PIB:TEM ratio of 1:2.5 with the same result.

PIB-based mastic with phenylmethyldimethoxysilane (PhMDM) in a 1:5.3 weight ratio did not dissolve at 55° C. even after 72 hours.

PIB-based mastic in dimethyldimethoxysilane (DMDM) at a 1:3.3 ratio produced no dissolution at room temperature, and after 48 hours at 55° C., the spheres of PIB were reduced to small granules with no free carbon black. A similar experiment using dimethyldiethoxysilane (DMDE) gave the same result, but the granules formed were finer than in the case of dimethyldimethoxysilane.

In contrast, when the strand-block mastic was mixed at room temperature in a 1:5.3 ratio with dimethyldi-n-butoxysilane (DMDB), about half the PIB dissolved in 5 minutes. The rest dissolved in a 55° C. oven in less than 30 minutes with occasional shaking. The particles formed were small and fluffy like those seen with xylenes.

A mixture of PIB based mastic and tolylethylmethyldi-n-butoxysilane (TEMDB) in a 1:3.2 weight ratio was heated in a 55° C. oven with occasional agitation. After 47 hours, the PIB was completely dissolved, and the mixture was filtered to remove the carbon black. The resulting yellow liquid was found to have a viscosity at room temperature of 43 cSt while the pure TEMDB has a viscosity of 4.74 cSt. This indicates TEMDB dissolves less PIB than DMDB.

Two other materials with structures similar to DMDB were also tested at a weight ratio of 3.3. Di-i-propyldimethoxysilane dissolved most of the strand-block mastic at room temperature, but visually better than DMDB. Di-n-butyldimethoxysilane, which has a molecular weight identical to DMDB dissolved only part of the PIB at room temperature and clearly better than DMDB.

Additional screening tests were performed on candidate fluids that showed minimal solubility to PIB-based mastics. Samples were prepared and placed in a 55° C. oven and removed periodically for shaking and observations. The results are summarized below in Table 8. Based on testing, CBM and PhMDM appear to be mostly insoluble with PIB mastic. However, TEM appears to be slightly soluble up to about 5%. While only CBM, TEM and PhMDM were analyzed in this study, it is appreciated that the methodology could be applied to other candidate fluids and this list is by no means exhaustive.

TABLE 8

Detailed screening of low solubility fluids

| Sample ID | Fluid Mixture | Wt % PIB | Results |
|---|---|---|---|
| DCB3-65F | CBM | 15% | After 24 h, very little of the PIB had dissolved. |
| DCB3-65E | TEM | 15% | After 24 h, some of the PIB had dissolved, and the rest could be dispersed with shaking. |
| DCB3-65I | TEM | 10% | After 24 h, about half of the material had dissolved, and the rest could be dispersed as small particles with shaking. |
| DCB3-65K | TEM | 5% | After 24 h, at least 3/4ths of the material had dissolved, and the rest could be dispersed as small particles with shaking. |
| DCB3-65D | PhMDM | 15% | After 24 h, the PIB had softened, but little appeared to be dissolved in the PhMe. |

Preferred Embodiments

Of the fluids evaluated in the screening tests above, cyanobutylmethyldimethoxysilane (CBM) and phenylmethyldimethoxysilane (PhMDM) were found to be poor solvents for dissolving PIB based strand-block mastic. In other words, PIB based strand-block mastic is mostly insoluble in CBM and PhMDM, which makes them ideal fluids for treating cables with PIB-based strand block mastic between the conductor strands. Tolylethylmethyldimethoxysilane (TEM) and dimethyldimethoxysilane (DMDM), were found to be moderate solvents with PIB based strand block mastic. Dimethyldi-n-butoxysilane (DMDB), tolylethylmethyldi-n-butoxysilane (TEMDB), Di-i-propyldimethoxysilane (DPrDM), and di-n-butyldimethoxysilane (DBDM) were found to be strong solvents for PIB based strand-blocked mastic. However, it should be appreciated that this list is purely demonstrative and other fluids not tested may exhibit similar behavior.

Example 2 (SBT11-Phase 2)

The following example demonstrates the advantages of injection fluids where PIB-based strand block mastic is less soluble.

A test apparatus similar to that shown in FIG. 3 was prepared. For this test, 2020 vintage Prysmain Doublseal 1/0 AWG, 15 kV cable was selected. This make and vintage was found to be particularly challenging to inject based on the measured fill % and physical properties of its particular strand block mastic. Three samples measuring 100 ft each were prepared for injection in accordance to Table 9 and the procedure below. All fluids were prepared with approximately 1% DDBSA catalyst.

TABLE 9

Test setup

| Sample No. | Fluid Solubility in PIB | Fluid Mixture | Approximate Initial Viscosity (cSt) |
|---|---|---|---|
| 1 | High-solubility | DMDB | 1.19 |
| 2 | Medium-solubility | 50:25:25, DMDB:CBM:TEM | 2.00 |
| 3 | Low-solubility | 50:50, CBMTEM | 2.85 |

The terminations of the cable were prepared with injection adapters installed over 2-hole lugs to seal the ends of the cable. Injection tools were connected to the injection adapters to allow for the injection of fluid into the cable conductor. The terminated cables were installed into the test setup and a temperature sensor was used to monitor cable temperature and relay the reading back to a temperature control switch. For the purpose of this example, a conductor temperature of 50° C. was maintained with a warming current of 250 amps. (Typical cable insulations are rated to run at 90° C., with emergency operation up to 130° C. on certain cables.) When the set temperature was achieved in the cable, the temperature controller would switch current off until the cable temperature dropped back below the lower set point. The tests were performed with an ambient temperature that ranged from between 15 to 17° C.

The results are summarized in Table 10. The injections of the low and medium-solubility fluids were run to completion in 2 hours and 33 minutes and 3 hours and 57 minutes respectively while the high-solubility sample failed to complete in nearly 7 hours as the viscosity of the fluid increased. During the first several minutes of the injections, the flow rate for the high-solubility fluid was fastest due to its relatively low viscosity compared to the other fluid mixtures. However, the flow rate for the high-solubility fluid dropped off quickly after the few tens of minutes and the injection was ultimately stopped after approximately 6 hours and 53 minutes. The cable sample was dissected and it was determined that the fluid front was at 66% of the total length. During the course of injection, the low-solubility fluid's flow rate was significantly more stable hovering near 20 mm/min on the flow meter.

TABLE 10

| | Results | | |
|---|---|---|---|
| | Sample | | |
| | High-solubility | Medium-solubility | Low-solubility |
| Injection Completion | 66% | 100% | 100% |
| Injection Duration (h:mm) | 6:53 | 3:57 | 2:33 |
| Weight Gain (g) | 215 | 255 | 159 |

Figure 5:
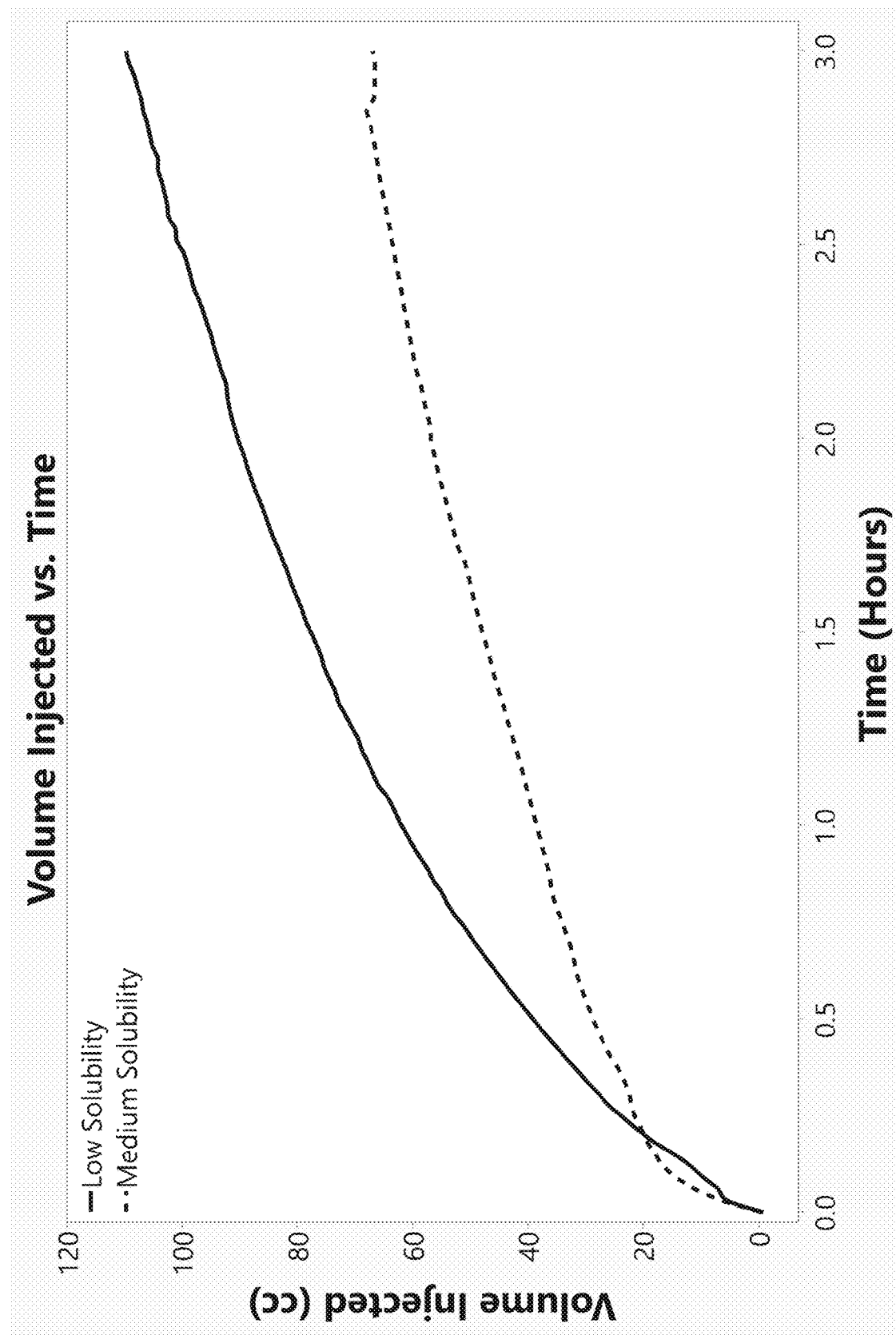
FIG. 5 is sample injection data showing the rate of injection for two injection fluids.

A similar study looked at the total volume of fluid injected over the course of the first 3 hours and is shown in FIG. 5. In this graph, the injected volume into cables treated by the low-solubility fluid and a medium-solubility fluid described in Table 5 are directly compared. The rate of injection begins proportionally to the starting viscosity of the two fluids. However, at approximately ¼ hour the total volume injected into each cables cross as the injection rate of the medium-solubility fluid slows relatively with the dissolution of the high-molecular weight PIB resulting dissolved into fluid resulting in an increased viscosity. By the end of the 3 hour injection, the low-solubility fluid has injected about 50% more fluid. The benefit of a low-solubility of PIB in the injection fluid is a particular benefit on long lengths of cable representative of cables installed common in field applications that may average 350 feet or more.

Fast Diffusing— T15 Results

The diffusion coefficients for many common injection fluids into polyethylene have been previously reported in literature and are summarized below in Table 11. When injecting cables at elevated temperatures, the diffusion coefficient can range by more than 10 times between the commonly used fluids at 55° C. and even more at 24° C. The diffusion coefficient at 55° C. is particularly interesting when injecting cable using thermally enhanced rejuvenation process.

As a preferred embodiment for strand blocked cable injection phenylmethyldimethoxysilane, dimethyldimethoxysilane and cyanobutylmethyldimethoxysilane may be of particular interest as they offer relatively fast diffusion and both were found to be poor solvents for dissolving PIB-based mastic during the screening tests described earlier.

Further, fluids that see a relatively large jump in diffusion rates between 24° C. and 55° C. may be particularly advantaged when the thermally enhanced rejuvenation process is employed for injection and/or soaking supplemental fluid into a cable to adequately treat the insulation. For example, cyanobutylmethyldimethoxysilane sees its diffusion rate increase 46 fold compared to other fluids that increase roughly by only one order of magnitude. While the table below lists only four common injection fluids, it is appreciated that the same method of selection could be applied to other fluids.

TABLE 11

Diffusion Coefficient for Common Injection Fluids

| Injection Fluid | Diffusion Coefficient ($cm^2$/sec) | |
| --- | --- | --- |
| | @ 24° C. | @ 55° C. |
| Dimethyldi-n-butoxysilane | 9.68E−9 | 9.14E−8 |
| Phenylmethyldimethoxysilane | 9.06E−9 | 9.63E−8 |
| Cyanobutylmethyldimethoxysilane | 1.95E−9 | 8.91E−8 |
| Tolylethylmethyldimethoxysilane | 6.38E−9 | 6.87E−8 |

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

What is claimed is:

1. A method for rejuvenating a longitudinally strand-blocked cable having a conductor comprised of a plurality of conductor strands with interstitial volume therebetween longitudinally blocked by a PIB-based strand-block mastic, the conductor being surrounded by a polymeric cable insulation, comprising:
   a. installing injection adapters that seal the cable ends of the longitudinally strand-blocked cable and are usable to inject fluid into the interstitial volume between the conductor strands of the cable;
   b. heating the cable to a temperature above ambient to decrease the viscosity of the PIB-based strand-block mastic, and elastically expanding the polymeric cable insulation through the application of pressure to the interstitial volume between the conductor strands of the cable; and
   c. injecting at least one injection fluid into the interstitial volume between the conductor strands of the cable in which the PIB based mastic is mostly insoluble, wherein the conductor temperature is above ambient during the injection, wherein the injection fluid maintains a viscosity of under 10 cSt throughout the course of the injection, and wherein a longitudinal flow path is established through the cable between the conductor strands of the cable.

2. The method of claim 1, where strand-block mastic has a solubility of under 10% in the injection fluid at 55° C.

3. The method of claim 1, where strand-block mastic has a solubility of under 5% in the injection fluid at 55° C.

4. The method of claim 1, where the injection fluid has a diffusion coefficient in the polymeric cable insulation of greater than $1.0 \times 10^{-8}$ $cm^2$/see at 55° C.

5. The method of claim 1, where the injection fluid is comprised primarily from a mixture containing Phenylmethyldimethoxysilane or Cyanobutylmethyldimethoxysilane.

6. The method of claim 5, where the injection fluid further contains a hydrolysis-condensation catalyst.

7. The method of claim 6, where the hydrolysis-condensation catalyst is dodecylbenzene sulfonic acid (DDBSA) or tetra-isopropyl titanate (TiPT).

8. The method of claim 1, where the conductor temperature is increased by about 40° C. above ambient during injection.

\* \* \* \* \*